(12) United States Patent
Jambois

(10) Patent No.: US 6,197,412 B1
(45) Date of Patent: *Mar. 6, 2001

(54) METHOD OF MANUFACTURE OF A PLASTIC COMPONENT WHICH IS INSENSITIVE TO THE ELEMENTS, AND A PLASTIC COMPONENT SO MANUFACTURED

(75) Inventor: John C. Jambois, Fargo, ND (US)

(73) Assignee: Tecton Products, Fargo, ND (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,950

(22) Filed: Nov. 4, 1997

Related U.S. Application Data

(63) Continuation-in-part of application No. 08/654,375, filed on May 28, 1996, now abandoned.

(51) Int. Cl.$^7$ ..................................................... B32B 27/06
(52) U.S. Cl. ................................. 428/297.4; 428/298.1; 428/300.7; 428/334
(58) Field of Search ................................. 428/334, 220, 428/297.4, 300.7, 298.1

(56) References Cited

U.S. PATENT DOCUMENTS

| | | | |
|---|---|---|---|
| 3,846,524 | 11/1974 | Elmore et al. | 264/45.3 |
| 4,394,338 | 7/1983 | Fuwa | 246/135 |
| 4,420,359 | 12/1983 | Goldsworthy | 156/379.8 |
| 4,543,145 | * 9/1985 | Schnell et al. | 156/231 |
| 4,938,823 | * 7/1990 | Balazek et al. | 156/166 |
| 5,098,496 | 3/1992 | Breitigam et al. | 156/180 |
| 5,407,610 | 4/1995 | Kohama et al. | 264/22 |
| 5,492,583 | 2/1996 | Fingerson et al. | 156/180 |
| 5,618,589 | 4/1997 | McFarland | 427/482 |
| 5,627,230 | 5/1997 | Weidner | 524/306 |
| 5,632,838 | 5/1997 | Weidner | 156/180 |
| 5,824,403 | 10/1998 | Eidenschink | 428/300.4 |
| 6,007,656 | 12/1999 | Heikkila et al. | 156/180 |

FOREIGN PATENT DOCUMENTS

| | | | | |
|---|---|---|---|---|
| 1209946 | 10/1970 | (GB) | | C07D/57/20 |
| 2186833 | 8/1987 | (GB) | | B29C/67/14 |

* cited by examiner

*Primary Examiner*—Elizabeth M. Cole
(74) *Attorney, Agent, or Firm*—Nawrocki, Rooney & Sivertson, P.A.

(57) ABSTRACT

A method of forming a plastic component. The method includes a first step of forming a profile by pulling fibrous material, having been wetted out by a resin, through a first die and curing the composite formed so that it maintains its ultimate shape. The surfaces to be coated are treated to create free radicals (bonding sites) which are then available for bonding of an acrylic compound coating. Thereafter, the acrylic compound is applied to the profile to form a coating directly thereon. Application is effected by passing the cured and treated profile through a crosshead extrusion die. The acrylic compound coating is bonded directly to the profile. The invention also includes a fiber reinforced plastic component manufactured in accordance with the method.

7 Claims, 1 Drawing Sheet

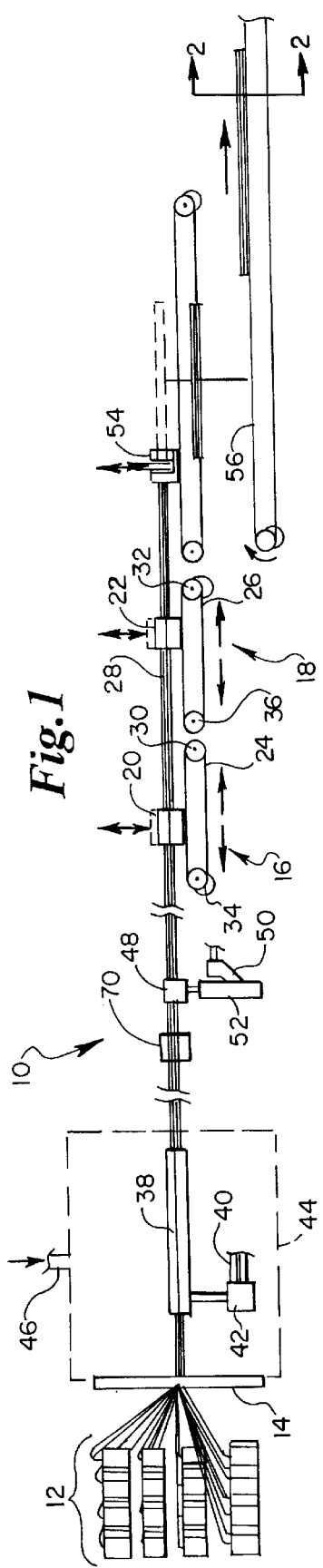
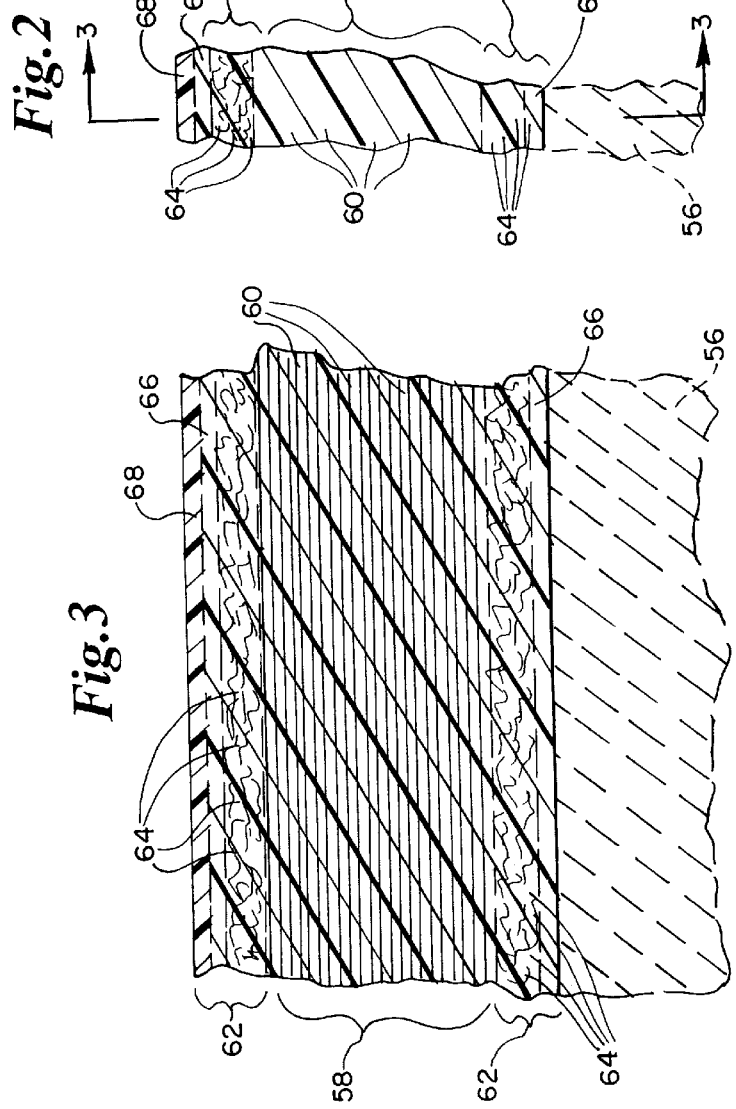

METHOD OF MANUFACTURE OF A PLASTIC COMPONENT WHICH IS INSENSITIVE TO THE ELEMENTS, AND A PLASTIC COMPONENT SO MANUFACTURED

CROSS-REFERENCE TO CO-PENDING APPLICATION

This is a continuation-in-part of application Ser. No. 08/654,375 filed on May 28, 1996, now abandoned.

TECHNICAL FIELD

The present invention deals with the manufacturing of pultruded plastic components. More particularly, however, the invention deals with a technology wherein pultruded plastic components are manufactured for use in window and door applications and other applications where the component is, in its operating environment, exposed to sunlight, weather, and other deleterious elements. The specific focus of the invention is the manufacture of a fiber-reinforced plastic component provided with a film coating which is weather resistant, ultraviolet resistant, durable, and decorative.

BACKGROUND OF THE INVENTION

It has long been recognized that the two most ultraviolet resistant plastic families are acrylics and fluoropolymers. Both plastics have fairly severe drawbacks when their contemplated end use is as a thin weatherable coating. Fluoropolymers are expensive to make. Physically, they are soft, making them very difficult and expensive to use for most outdoor weatherable coating applications.

Acrylics, on the other hand, are relatively inexpensive. Physically they are hard and brittle.

Both fluoropolymers and acrylics have been used in solvent-borne paint systems where they essentially form small pigmented platelets that are held together by some more suitable backbone resins such as urethanes, latexes, alkyds, etc. While the fluoropolymer and acrylic platelets are ultraviolet resistant, the carrying or backbone resin of the solvent or waterborne coating systems (paint) are not and are, thus, the limiting factor in the serviceable life of these coatings.

Additionally, these systems make extensive use of volatile organic compounds which are regulated as environmental pollutants and are expensive to dispose of. It is also widely known that the weatherability of acrylics increases as the molecular weight of the acrylic increases. However, the melt flow rate (how much flows in a given amount of time at a given temperature and pressure) goes down as molecular weight increases. Thus, the more easily the acrylic is handled (high melt flow), the less optimized it is for weatherability, and also the more brittle it becomes. Thus, the most common weatherable uses of thermoplastic acrylic have been thick sheets of plexiglass having a high molecular weight, such as polymethylmethacrylate (PMMA) (i.e., plexiglass as a thin 2–10 mil calendar rolled film). Normally, these films are calendar rolled with a less brittle, more easily handled, but far less weatherable backing film such as vinyl. For example, high molecular weight PMMA could be nipped between calendaring rolls along with vinyl at temperatures and pressures to form an intimately bonded two layer film 8 mils thick (4 mils each of PMMA and vinyl). In the first instance, the PMMA is so thick, expensive, and hard to conform to a substrate (process unfriendly), it is not typically used as a weatherable coating. In the second instance, the cost of calendar rolling the acrylic/vinyl film itself, and the cost of the application machinery means that, while the material is much more process friendly, it is normally only feasible to use with a specialty, high value product due to high cost per unit of surface area relative to other coating systems.

Various industrially manufactured components are, in use, exposed to the elements. Such elements include rain, snow, wind, temperature extremes, ultraviolet radiation, and chemical pollutants. Further, such components can be, from time to time, exposed to various types of impact.

A typical component of this nature is a window frame or a door frame. Typically, such assemblies are made of wood, vinyl or metal. In order to make them more durable and to overcome some of the limitations caused by the elements discussed above, various types of coatings have been developed and methods for applications of such coverings have been conceived.

A first method of forming a product is known as co-extrusion. In this process, a thermoplastic material such as vinyl is extruded through a forming die to form a profile. Typically, a "capstock", having more expensive pigments, ultraviolet absorbers or blockers, a higher thermoresistance, etc., is concurrently co-extruded to areas that will require greater protection or need a decorative color. Such a "capstock" is a similar thermoplastic material or a compatible thermoplastic.

A second process is known as film wrapping. In this process, a base profile, such as a thermoplastic vinyl extrusion or thermoset pultrusion, is wrapped in a solid, non-molten thermoplastic film. The solid film is, typically, a calendar rolled sheet of two or more plastics (i.e., acrylic and vinyl), and it contains the necessary pigment, ultraviolet absorbers or blockers, etc. The solid film, thereby, provides the protection or decoration to the base profile. In this process, the solid film is secured in place by means of a hot melt or solvent-based adhesive.

A third process known in the art is crosshead extrusion coating or encapsulation. In this process, a profile such as shaped wood is passed through a die which generally conforms to the profile shape. A thermoplastic in flowable form is fed to the die. Typically in this process, the encapsulating material is not required to be adhered to the profile due to the differences in coefficients of thermal expansion. Indeed, it is better if the encapsulating material is not adhered to the profile due to the difference in coefficients of thermal expansion.

None of these methods, however, overcomes the limitations as previously discussed. In some cases, the process proves to be unwieldy; in other cases, the final product does not prove to be sufficiently durable and resistant to ultraviolet radiation, etc. Other drawbacks are cost and time limitations.

It is to these shortcomings and dictates of the prior art that the present invention is directed. It is a process for the manufacture of a reinforced plastic component (for example, of door and window frames) which overcomes many of the deficiencies of the prior art, and a product made in accordance with the process.

SUMMARY OF THE INVENTION

The present invention encompasses a plastic component. The component includes a profile having a substrate surface which is formed of a fiber-reinforced, thermoset material. The substrate is die-formed, and a film, of a thermoplastic compound, is bonded directly to the substrate.

In one embodiment of the invention, the profile includes a core of lineal fibers. The component of that embodiment can further include a mat of fibers which is applied to one side or each of opposite sides of the core of lineal fibers. The mat(s), and the core of lineal fibers, are wetted out by a resin mixture. In the preferred embodiment, a resin-rich top layer is formed at the surface in contact with the hot forming die.

In the preferred embodiment, the profile is formed using a pultrusion process. The fibers, having been wetted out by a resin mixture, are pultruded through a heated die. The partially cured substrate is then treated to create radicals on the surfaces to be coated.

A second, crosshead extrusion die can also be employed. Such a die can be used in the process to apply the melted thermoplastic compound, typically an acrylic, to the profile forming a thin weatherable protective film or coating. It will be understood that the thermoplastic coating does not define a separate profile. Rather, it is merely a die-applied thin film.

The present invention combines a profile that, due to its near ideal coefficient of thermal expansion, low thermal conductivity, non-corrosiveness, and structural properties (high strength to weight, high stiffness plus the fact that it will not swell with moisture) and its ease and economy of manufacture, make it extremely well-suited for outdoor weatherable applications (such as window and door frames) with the near ideal outdoor weatherable coating (high molecular weight thermoplastic acrylic compounds) to protect the resin system of the pultrusion. The invention does this, minimizing coating material usage by only coating areas exposed to the weather, applying the coating in-line during the pultrusion manufacturing process, and it does it without adhesives, tie layers or other additional handling or added expense for the disposal of overspray or volatile organic compounds contained in the coating. Additionally, by bonding the thermoplastic, acrylic compound coating to an essentially rigid fiber reinforced thermoset substrate, the invention overcomes the problems that acrylics inherent brittleness normally causes when used as thin coatings.

The invention also comprises a method of forming a reinforced plastic component as described hereinbefore. Such a method includes a first step of forming a profile by pultruding fibrous material through a first die. The fibrous material, prior to being pultruded through the die, is wetted out with a resin mixture either in a bath or at the entrance of the pultrusion die. After the profile is formed and, in a preferred embodiment, substantially fully cured, its surface is treated, and a thermoplastic compound such as an acrylic is applied thereto to form a thin protective, decorative coating on the profile. The coating is applied directly to the treated profile by passing the profile through a crosshead coating die. Alternatively, the profile is only partially cured prior to the acrylic compound coating layer being applied, and the acrylic is allowed to chemically bond directly to the profile as it cures.

In a preferred embodiment of practicing the method, the fibrous material includes both lineal and omnidirectional fibers. Finally, if desired, the acrylic compound coated substrate can be cut to length.

The present invention is thus a method of manufacture of a fiber reinforced plastic component, and a fiber reinforced plastic component so manufactured. More specific features and advantages obtained in view of those features will become apparent with reference to the DETAILED DESCRIPTION OF THE INVENTION, the appended claims, and accompanying drawing figures.

BRIEF DESCRIPTION OF THE DRAWING

FIG. 1 is a simplified longitudinal diagram of a process line used in practicing the present method invention;

FIG. 2 is a fragmentary section elevational view taken generally along a portion of line 2—2 of FIG. 1, greatly enlarged and showing some parts in phantom-lines; and FIG. 3 is a fragmentary section taken generally along line 3—3 of FIG. 2.

DETAILED DESCRIPTION OF THE INVENTION

Referring now to the drawings wherein like reference numerals denote like elements throughout the several of views, FIG. 1 illustrates a process line 10 used in performing the present method invention. In some respects, the process line 10 is typical of pultrusion lines known in the prior art. For example, a supply 12 of fibers are fed into a carding plate or preformer 14. As in known processes, the fibers can be both lineal and forming mats of continuous omnidirectional or oriented fibers. Further, a plurality of puller assemblies 16,18 can be provided proximate the output end of the process line 10. At this point in the process, the fibers have already been coated with various agents in accordance with the invention (as will be discussed hereinafter), but they are fed into clamping structures 20,22 of the puller assemblies 16,18 to enable the pieces to be worked to be pulled through the various stations.

The clamps 20,22 are shown as being mounted on reciprocally movable continuous belts 24,26 so that, as a clamp of one puller assembly exerting tension on the material 28 being drawn through the various stages approaches a right spindle 30,32 (as viewed in FIG. 1) over which the continuous belt 24,26 carrying the particular clamp 20,22 passes, the tension exerted by the clamp 20,22 on the workpiece 28 being drawn through the stations can be released, and the clamp 20,22 can be moved leftwardly (as viewed in FIG. 1) to a location proximate the left spindle 34,36 over which the belt 24,26 carrying the clamp 20,22 passes. Tension can then again be taken upon the workpiece 28 and the particular puller assembly 16,18 can then again effect pulling action.

It will be understood that the operation of the various puller assemblies 16,18 is synchronized. That is, as tension exerted by the clamp of one puller assembly is released so that the puller assembly clamp can be moved back to the left, the clamp of the other puller assembly will continue to effect pulling action so that the pultrusion process will not be interrupted.

FIG. 1 illustrates a first die 38 through which the fibers are drawn after passing through the carding plate or preformer 14. Resin mixture passing through a supply conduit 40 is fed to the die 38 by a feed mechanism 42. The invention contemplates various resin mixtures to be fed to the pultrusion die 38. In accordance with the invention, the media so fed is a thermoset type product. The media selected is one which will, in a preferred embodiment, cure substantially completely before the application of a coating of another media, as will be discussed hereinafter.

Treating of surfaces to be coated is undertaken to create free radicals (bonding sites) on the cured profile's surface. When placed in intimate contact with a molten acrylic compound, the free radicals on the surface of the profile chemically bond with available sites in the acrylic compound coating. Treating can be with a flame, via corona discharge, suppressed spark, or, more preferably, plasma treating.

Relatively proximate the pultrusion die 38 along the process line 10, in a direction in which the workpiece moves through the line, is a crosshead extruder die 48. As the treated fiber reinforced thermoset plastic profile 28 is drawn through the crosshead extruder die 48, a molten acrylic compound is fed through a media supply line 50 to the extruder die 48 by an extruder feed mechanism 52. In the extruder die 48, the molten acrylic compound is coated directly on the fiber reinforced thermoset, resin matrix. The coating of the acrylic compound is such as to form a fine film. Typically, the acrylic coating would be approximately four mills in thickness.

The thermoplastic acrylic is compounded so as to contain many of the properties necessary to make the product being formed more durable. For example, it is desirable that the part, in many applications, be ultraviolet insensitive. Consequently, the acrylic is compounded with ultraviolet blockers or attenuators to achieve this goal. Pigments for color are also compounded. Similarly, the acrylic has properties which render it essentially impervious to the elements of wind, rain, and snow.

A typical application for the product being formed is the frame for a window or door. Consequently, the profile would be formed in the pultrusion die 38 to a desired shape. It is desirable that only certain surfaces be coated with the acrylic compound. This is so since only certain surfaces of the profile are exposed to the elements, and, by minimizing the extent of coating, cost can be reduced. Consequently, only those surfaces exposed to the elements would typically be coated with the acrylic compound in the crosshead extrusion coating die.

In any case, after the acrylic compound is applied, the film formed thereby is bonded directly to the profile formed in the pultrusion die 38. During and shortly after application of the acrylic compound, a bonding of the acrylic compound to the fiber reinforced thermoset plastic profile occurs. If desired, a flying cut-off saw 54 is used to cut the workpiece 28 to desired lengths. The lengths so cut can be positioned on a conveyor 56 for movement for appropriate disposition.

FIGS. 2 and 3 illustrate, in cross section, a wall of, for example, a window frame manufactured in accordance with the method performed by use of the process line 10 described hereinbefore. Those figures illustrate a profile which has a core 58 formed from lineal fibers 60. The core 58, in turn, has applied to each of opposite sides thereof a mat 62 of fibers 64. Each of these components is fed from the fiber supply 12 to the carding plate/preformer 14 to position the various fibers in the right orientation prior to being fed into the pultrusion die 38. Prior to entry into, or at the entrance of, the pultrusion die 38, the core 58 and mats 62 are wetted out with a thermoset resin. FIGS. 2 and 3 illustrate a resin-rich layer 66 forming the outer surface of the substrate.

FIGS. 2 and 3 also show a thin film layer 68 formed on the surface of the resin-rich layer 66 of the substrate. In these particular figures, the acrylic coating 68 is shown as having been applied to the upper substrate surface. This acrylic coating 68, of course, is the coating applied by the crosshead extruder die 48.

It will be understood that various shaped profiles can be formed in accordance with the process. The shape and size of the product will be dictated by the orifice shape and size in the pultrusion die.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A plastic component, comprising:
   (a) a die-formed, fiber-reinforced, pultruded thermoset profile defining a substrate surface; and
   (b) a thermoplastic compound film bonded directly to said substrate surface that follows the contours of the said substrate surface and does not define a separate profile, said thermoplastic compound film having a thickness of substantially four mills.

2. A component in accordance with claim 1 wherein said pultruded thermoset profile includes a core of lineal fibers.

3. A component in accordance with claim 2 wherein said profile further includes a mat of fibers applied to at least one of opposite sides of said core of lineal fibers, said core of lineal fibers and said at least one mat wetted out with a resin.

4. A component in accordance with claim 3 wherein said profile is formed using an in-line pultrusion process.

5. A component in accordance with claim 4 wherein said thermoplastic compound thin film is formed using crosshead extrusion.

6. A component in accordance with claim 5 wherein said thermoplastic compound thin film is applied to said profile after said profile is cured.

7. A component in accordance with claim 6 wherein said thermoplastic compound thin film is acrylic.

* * * * *